Dec. 12, 1944. V. N. DI'VOZZI 2,364,956
AIRPLANE
Filed Sept. 11, 1941  4 Sheets-Sheet 2
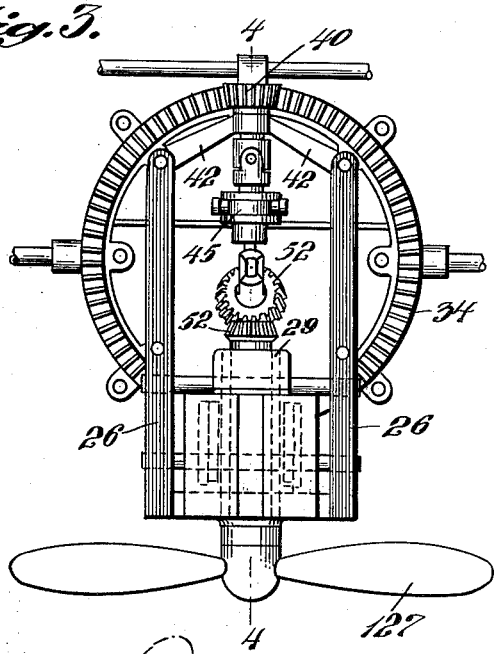
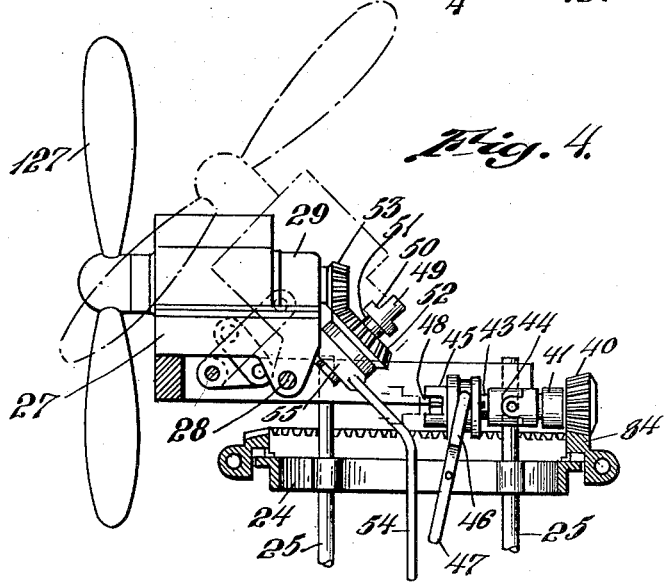
INVENTOR
Vincent N. Di'Vozzi
BY Barlow & Barlow
ATTORNEYS

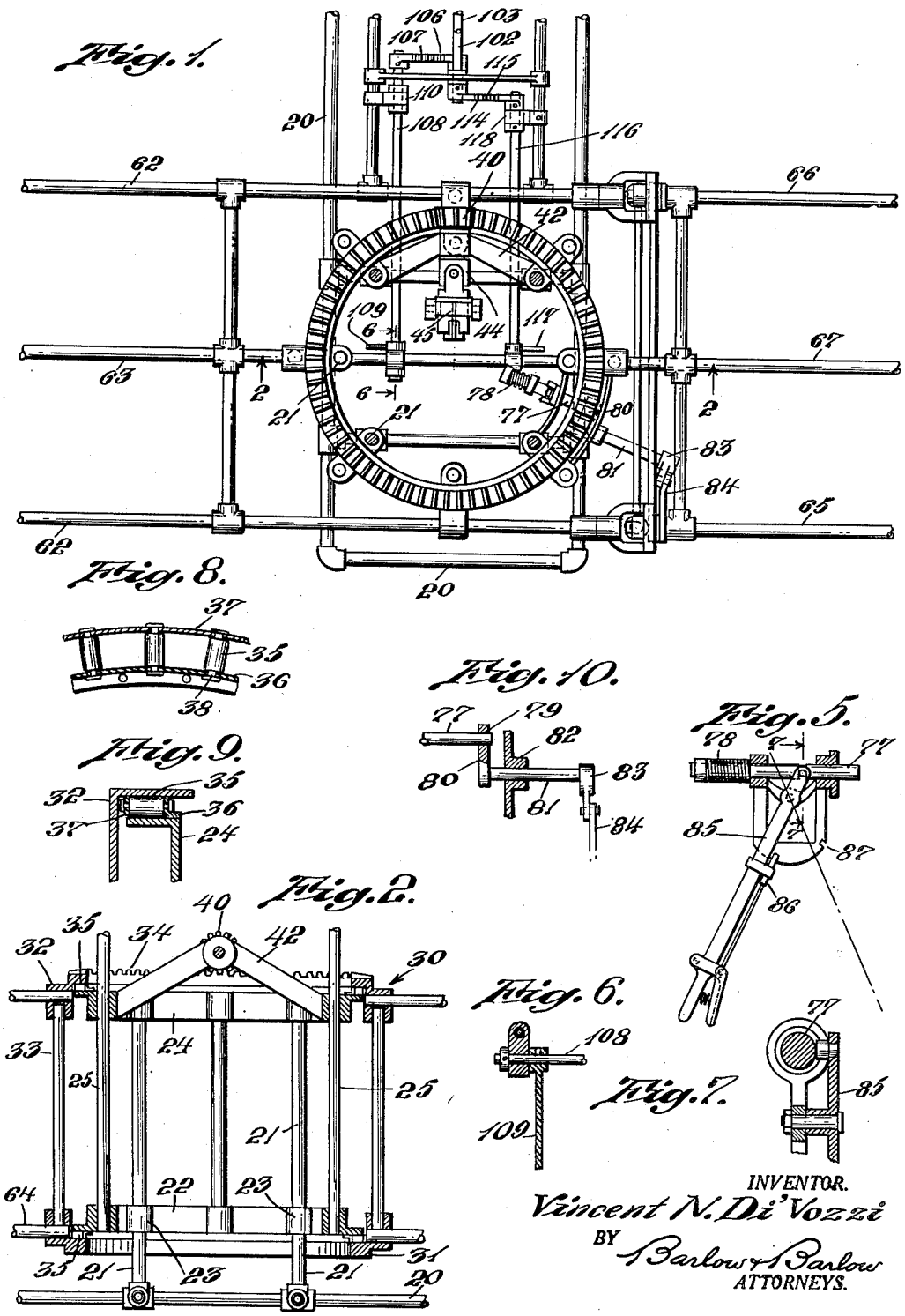

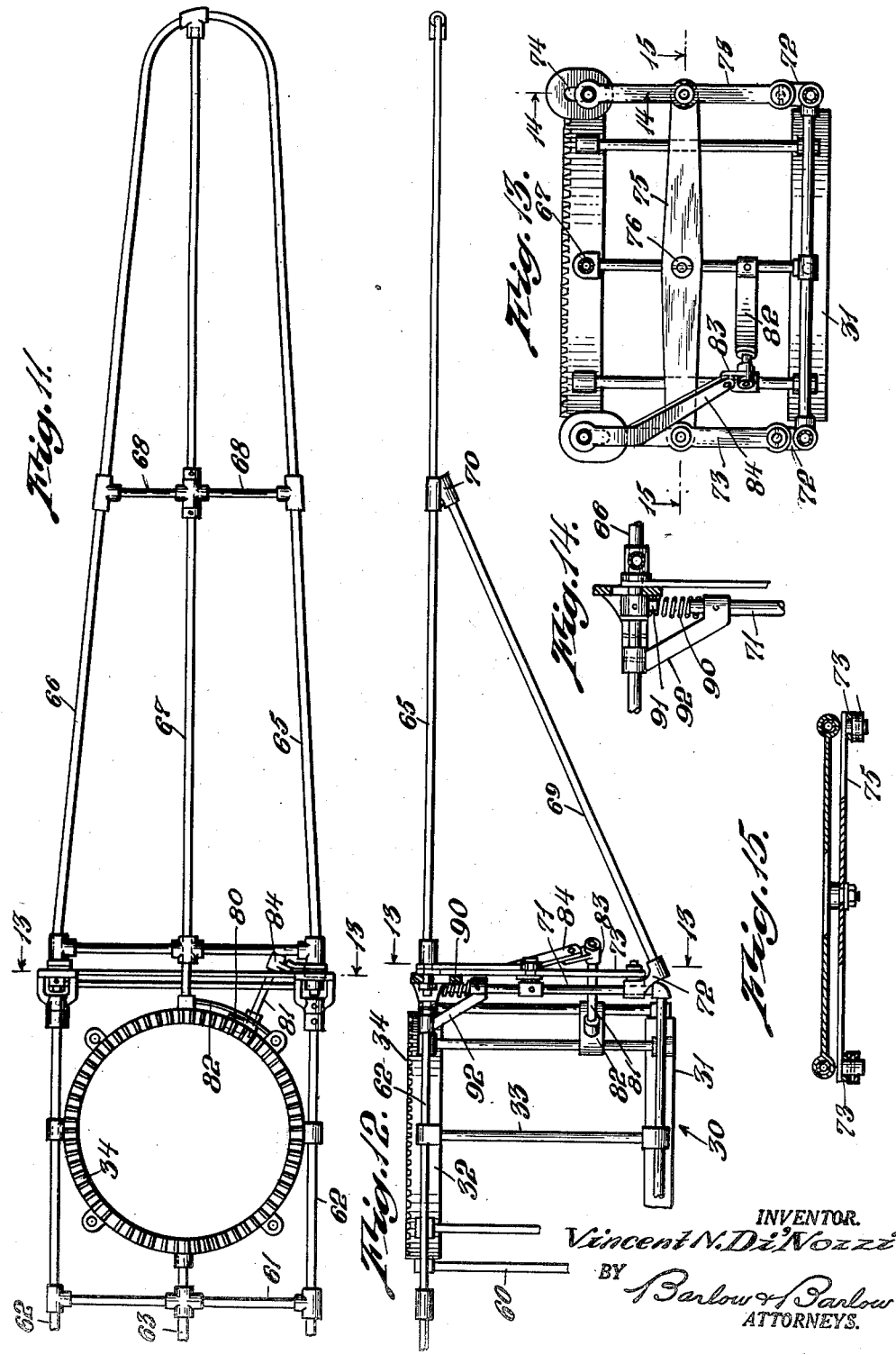

Dec. 12, 1944.   V. N. DI'VOZZI   2,364,956
AIRPLANE
Filed Sept. 11, 1941   4 Sheets-Sheet 4
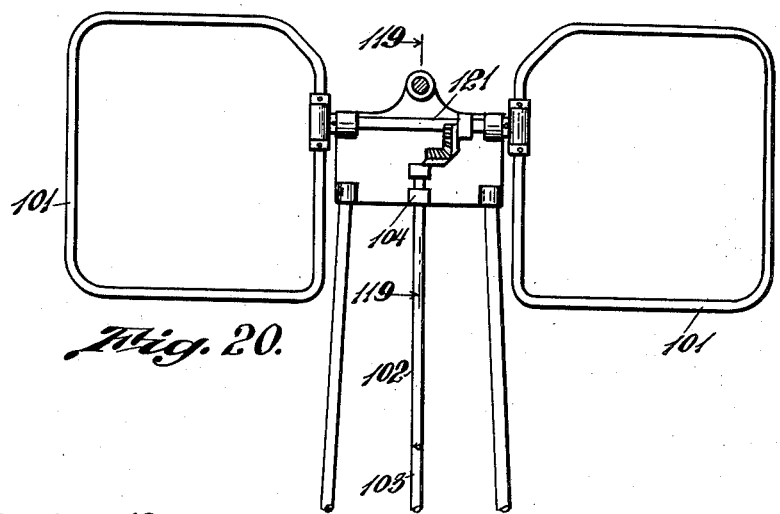
Fig. 20.
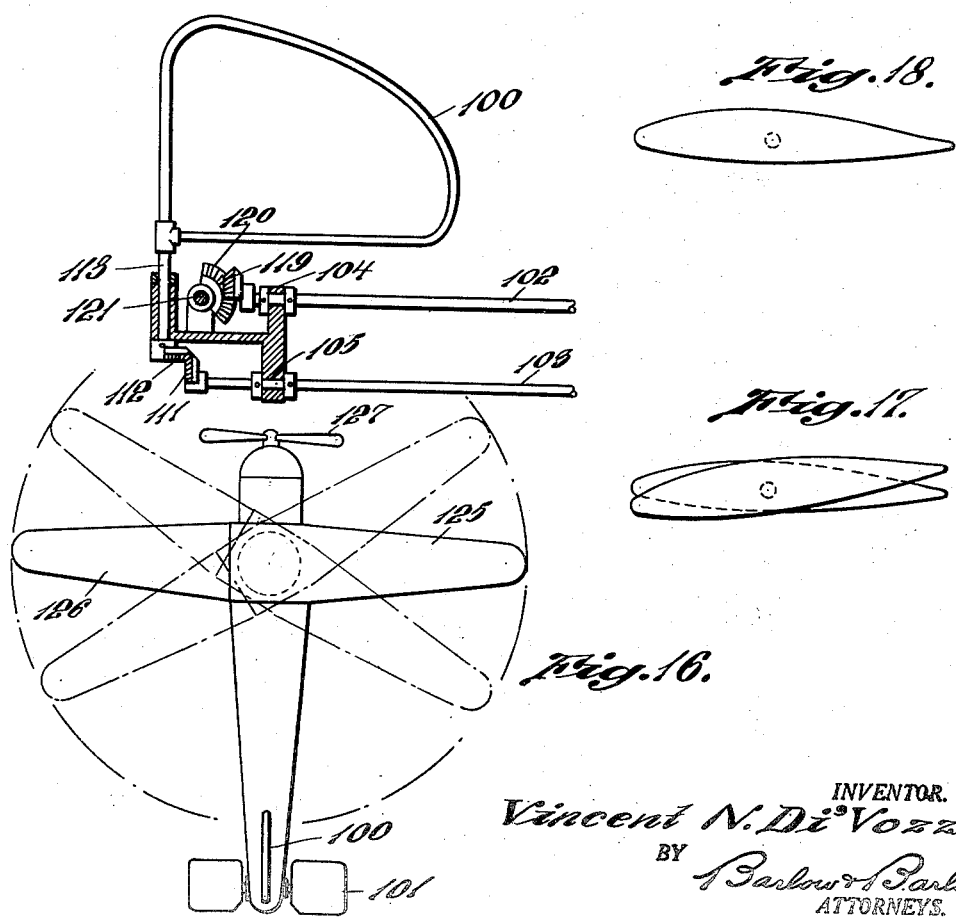
Fig. 19.
Fig. 18.
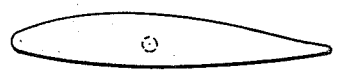
Fig. 17.
Fig. 16.
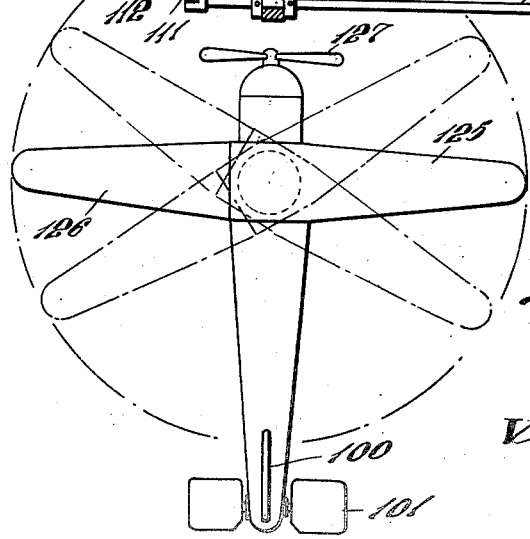
INVENTOR.
Vincent N. Di'Vozzi
BY
Barlow & Barlow
ATTORNEYS.

Patented Dec. 12, 1944

2,364,956

UNITED STATES PATENT OFFICE 2,364,956

AIRPLANE

Vincent N. Di Vozzi, Newport, R. I.

Application September 11, 1941, Serial No. 410,418

3 Claims. (Cl. 244—7)

This invention relates to an airplane of the heavier-than-air type.

In the use of airplanes with fixed sustaining wings, it is customary and usually necessary to land or take off by reason of an extended run along the ground. The helicopter principle has been utilized in some airplanes but this principle, as heretofore used, has restricted materially the maneuverability of an airplane.

One of the objects of this invention is to provide an arrangement for landing the usual type of fixed wing airplane in a more restricted space.

Another object of the invention is to utilize the main wings, which are usually fixed, for operation upon the helicopter principle in assisting in landing the airplane in a more restricted space.

Another object of the invention is to utilize the main wings by converting them into an arrangement which will give some lift to the plane as the wings are rotated about a vertical axis.

Another object of the invention is to utilize the motor for driving the propeller for also driving the wings about a vertical axis.

Another object of the invention is to utilize the propeller driven about an upwardly inclined shaft and also the wings driven about a vertical axis on the helicopter principle for combining to give some lifting action to the airplane as the airplane is maneuvered.

Another object of the invention is to simplify the controls of the airplane, such, for instance, as the rudder, elevators, etc.

With these and other objects in view, the invention consists of certain novel features of construction, as will be more fully described, and particularly pointed out in the appended claims.

In the accompanying drawings:

Fig. 1 is a top plan view of the two frames and certain stationary framework of the airplane in an arrangement to show the relative movement of the parts, while omitting the body and much of the usual well-known mechanism visible in top plan;

Fig. 2 is a sectional view on substantially line 2—2 of Fig. 1, also shown fragmentally to illustrate the relatively fixed and rotating parts of this center portion of the airplane;

Fig. 3 is a top plan view illustrating the rotary gear shown in Fig. 1 and also the mounting of the engine above the same, with the remainder of the mechanism shown in Fig. 1 omitted;

Fig. 4 is a sectional view of the structure shown in Fig. 3 and taken on substantially line 4—4 of Fig. 3;

Fig. 5 is a fragmental detail illustrating the mounting of the lever for withdrawing the locking pin;

Fig. 6 is a section on line 6—6 of Fig. 1;

Fig. 7 is a section on line 7—7 of Fig. 5;

Fig. 8 is a top plan view of the roller bearing mounting for the wing carrier frame;

Fig. 9 is a sectional view also showing the roller bearing mounting of Fig. 8;

Fig. 10 is a detail, largely diagrammatic, illustrating the connection of the locking pin of Fig. 5;

Fig. 11 is a top plan view of the movable wing frame and the movable carrier therefor with its gear;

Fig. 12 is an elevation, also fragmentally shown, of the structure shown in Fig. 11;

Fig. 13 is a sectional view on substantially line 13—13 of both Figs. 11 and 12;

Fig. 14 is a section on line 14—14 of Fig. 13, showing the resilient mounting for shifting the two frames when the locking means therefor are removed;

Fig. 15 is a section on line 15—15 of Fig. 13;

Fig. 16 is a top plan view of the airplane illustrating in dot-dash lines position of rotation of the wings;

Fig. 17 is a side view of the wings in shifted relationship;

Fig. 18 is a side view of the wings in aligned relationship;

Fig. 19 is a fragmental end view, partly in section, illustrating a control for the rudder; and Fig. 20 is a top plan view, fragmentally shown, of a control for the elevators.

In proceeding with this invention, I have suitably arranged a fixed part on the framework of the airplane and rotatably mounted a wing carrier on this fixed structure, which may rotate about a normally vertical axis. The airplane is of the monoplane type with main oppositely extending right and left wings. The rotatable wing carrier has one of these wings fixed with relation to it, while the other wing may tilt about an axis extending lengthwise of the wing. Thus, by first tilting one of these wings and then rotating both wings, a lifting action may be had. I have also arranged for the tilting of the motor which drives the propeller and which motor, when tilted, may drive the wings. The propeller may remain fixed with the motor to also give some elevating action by reason of its rotation about an upwardly inclined axis which will correspondingly decrease its forward drive but yet will be sufficient so as to maintain the airplane in maneuverability. In order to control the rudder and elevators, I rotate shafts about their longitudinal axes with gear means for translating movement into the desired arcuate movement at the ends for further effecting control of the airplane.

With reference to the drawings, the main fixed framework of the airplane is designed generally 20, I having shown only such portions of it as are connected to other parts which enter into the inventive structure herein disclosed. Supported upon this framework 20 are upright posts 21 which carry a lower annulus 22 having bosses 23 secured to these posts 21, while there is an upper annulus 24 similarly supported. Additional posts 25 secured to both annuluses extend upwardly therefrom for supporting the bed 26 on which the cradle 27 is pivoted as at 28 for rockably mounting the engine or motor 29 pivotally with relation to the bed.

A wing carrier, designated generally 30, is of a squirrel-cage type construction (see Figs. 2 and 12) and consists of a lower annular plate 31 and an upper annular plate 32 with vertical rods 33 extending between these plates and connecting them together in vertically spaced rigid parallel relationship. An annular gear 34 is cut upon the top of the plate 32. This squirrel-cage carrier 30 has a portion of its plate 32 located above and in spaced relation to the plate 24 (see Fig. 9) with anti-friction rollers 35 between the two plates, while the plate 31 extends beneath and under the plate 22 which is provided with anti-friction rollers 35. These rollers are mounted on the fixed plates 24 and 22 by means of spaced concentric flanges 36 and 37 (see Fig. 8) with the rollers 35 provided with trunnions 38 extending into suitable notches in the flanges so as to retain them in place. These flanges 36 and 37 may be secured in any suitable manner, such, for instance, as by welding, to the plates 22 and 24 to retain them in desired relation.

A pinion 40 is supported as at 42 (see Figs. 1, 2, 3, 4) by braces from the plate 24 and is in constant mesh with the ring gear 34. The shaft 43 is secured to the pinion 40 and drives the same through universal joint 44 which is provided with a clutch coupling 45 operable by forked arm 46 and handle 47 (see Fig. 4). This clutch coupling is slidable on the shaft 43 and is provided with a slot 48 to connect with the reduced key 49 by a head 50 on a shaft 51 which is driven by bevel gear 52 in mesh with bevel gear 53 which is driven by the motor 29.

When it is desired that the motor shall drive the wing carrier, the handle 54, which attaches to the bearing 55 for the shaft 51 and which is also fixed to the cradle 27 upon which the motor is mounted, is swung so that the motor swings about the pivot 28 fixed on the support bars 26 secured to the posts 25. This action positions the shaft 51 substantially in alignment with the shaft 43 which drives the pinion 40. The handle 47 is then manipulated to slide the clutch coupling so that the slot 48 receives the key portion 49; and then the engine will operate the bevel gear 40 and the ring 34 for rotation of the cage-like structure which carries the wings.

The wing carrier 30 is mounted in a generally cubical frame (see Figs. 11 and 12) consisting of vertical bars 60, bars 61 extending longitudinally of the airplane, and bars 62 extending crosswise of the airplane. The bars 62 are constructed to form the leading and trailing edges of a wing fixed to the cage which has a center bar 63 and other bracing bars such as 64 extending upwardly to meet the bar 63. This wing is fixed to the carrier 30 so as to rotate therewith and is maintained in a permanent position with reference to the carrier. Connections between the rods of the frame are of any suitable construction, I having shown coupling joints at the crossings for reinforcement and for secure connection, although other arrangements may be provided.

The other wing is attached to the carrier in such a manner that it may be tilted about its center; and this wing frame is therefore a complete unit in itself mounted on the carrier for movement and comprises a bar 65 for the leading edge and bar 66 for the trailing edge with a center bar 67 running lengthwise of the wing and about which point as an axis the wing may pivot. Reinforcement by brace bars 68 is provided between the bars 65 and 67 and bars 66 and 67. At the inner edge of the wing, brace bars 69 extend from a point 70 beneath the bars 68 to vertical guide rods 71 on which the inner ends of the brace rods 69 are slidably connected by coupling 72. Links 73 are connected to these slides 72 and also to the upper ends of the bars 65 and 66. The bars 65 and 66 are connected through slots 74 to the carrier frame and may rock about the axis of the bar 67 as a center by sufficient looseness being provided in these slots. The links 73 are connected together by a link 75 pivoted as at 76 so that motion will be transmitted oppositely to the links 73 and whereby the leading edge 65, which is normally elevated, may be lowered, while the trailing edge will be raised to provide an opposite elevation from that which is usually provided.

I lock the wing in a position so that the leading edge 65 will be elevated and the wings on either side will be in alignment as illustrated in Fig. 18. This lock (see Fig. 5) consists of a pin 77 urged by spring 78 into a position so as to enter an opening 79 (see Fig. 10) in a bell crank arm 80 on shaft 81 supported as at 82 and connected by crank 83 and link 84 to the linkage 73 (see Fig. 13). When this pin is retracted by handle 85 (see Fig. 5) and held in position by a dog 86 in one of the notches 87, the wing is free to be tilted about the axis 67 as a center; and this tilting is performed by a spring 90 (see Fig. 14) supported on the end of the rod 71 which is retained in position by bracket 92. The spring engages beneath the trailing edge 66 of the wing frame on the guide pin 91; and when the lock pin is released, this spring urges this trailing edge upwardly, and the leading edge will pivot downwardly about the axis 67 to give the desired inclination to the wing (see Fig. 17). This wing tilting will be performed just prior to, or simultaneously with the swinging of the motor into position so as to drive the ring gear and cause the wings to rotate about a vertical axis on the heliocopter principle.

In Fig. 16, I have illustrated a rudder 100 and elevators 101. These are controlled by rods one above the other, as 102 and 103, mounted in bearings, as 104 and 105, and which rotate about their longitudinal central axis. The rudder control is operable by the lower rod 103 which at its inboard end (see Fig. 1) is connected to gears 106 and 107, the latter gear being swingable by shaft 108 and handle 109. The shaft 108 has its bearing at 110. At the outboard end (see Fig. 16) of rod 103, there is a gear 111 mounted to mesh with bevel gear 112 which is secured to the shaft 113 for swinging the rudder 100.

The elevators are controlled by shaft 102 which at its inboard end (see Fig. 1) has meshing segmental gears 114 and 115, the latter being mounted on rod 116 swingable by handle 117 and having a bearing at 118. At the outboard end of this rod (see Fig. 19), there is a bevel gear 119 meshing with another bevel gear 120 secured to shaft 121 and which upon rotation will swing the elevators 101 about this shaft as an axis to provide the inclination for the control of the airplane.

If it is desired to descend, the wings, designated 125 and 126, will be rotated as illustrated in the dot-dash lines; and at the same time the propeller 127 will be tipped upwardly as illustrated in Fig. 4 so that some upward sustaining force will be provided.

By this arrangement, it will of course be apparent that much less area need be provided for landing the airplane than were the wings fixed and their support dependent by their forward motion through the air.

I claim:

1. In an airplane having main supporting wings rotatable about a vertical axis, a traction propeller for driving said airplane the blades of which normally extend into the path of rotation of said wings, and means for moving said blades out of said path of rotation when said wings are rotated.

2. In an airplane having main supporting wings rotatable about a vertical axis, a traction propeller for driving said airplane and mounted above said wings and having the blades thereof normally extending into the path of rotation of said wings, and means for moving said blades out of said path of rotation when said wings are rotated.

3. In an airplane having main supporting wings rotatable about a vertical axis, a motor movably mounted at a position located above said wings, a propeller attached to said motor and driven thereby and movable therewith, the blades of said propeller normally extending into the path of rotation of said wings, and means for moving said motor to move said blades out of said path of rotation when said wings are rotated.

VINCENT N. DI VOZZI.